(12) United States Patent  
Takahashi

(10) Patent No.: US 7,573,216 B2  
(45) Date of Patent: Aug. 11, 2009

(54) WINDOW OPENING AND CLOSING CONTROLLER

(75) Inventor: Tomohiro Takahashi, Toyota (JP)

(73) Assignee: OMRON Corporation, Kyoto (JP)

( * ) Notice: Subject to any disclaimer, the term of this patent is extended or adjusted under 35 U.S.C. 154(b) by 152 days.

(21) Appl. No.: 11/934,514

(22) Filed: Nov. 2, 2007

(65) Prior Publication Data

US 2008/0061720 A1  Mar. 13, 2008

Related U.S. Application Data

(63) Continuation of application No. 11/386,052, filed on Mar. 21, 2006, now Pat. No. 7,411,364.

(30) Foreign Application Priority Data

Jun. 28, 2005  (JP) ............................. 2005-187688

(51) Int. Cl.  
*E05F 15/16* (2006.01)

(52) U.S. Cl. ..................... 318/286; 318/266; 318/469

(58) Field of Classification Search ......... 318/264–266, 318/283, 286, 434, 466–470; 388/903; 49/26, 49/28  
See application file for complete search history.

(56) References Cited

U.S. PATENT DOCUMENTS 5,245,217 A * 9/1993 Honma ..................... 307/10.1  
6,100,658 A * 8/2000 Kume et al. ................ 318/286  
7,067,794 B2 * 6/2006 Le Gallo et al. ............ 250/221  
2003/0006728 A1 * 1/2003 Spreng et al. ............... 318/474  
2004/0212338 A1 * 10/2004 Shimizu et al. ............. 318/469  
2006/0290309 A1 * 12/2006 Saitou et al. ................ 318/469

FOREIGN PATENT DOCUMENTS

JP  9-125815  5/1997  
JP  2004-244956  9/2004

OTHER PUBLICATIONS

Japanese Office Action for Japanese Patent application No. 2005-187688, mailed Feb. 5, 2008, and English translation thereof, 4 pages.

* cited by examiner

*Primary Examiner*—Bentsu Ro  
(74) *Attorney, Agent, or Firm*—Osha • Liang LLP

(57) ABSTRACT

A window opening and closing controller for stably detecting jamming without having any influence on jamming load even when power voltage is changed is to be provided. In a window opening and closing controller for detecting jamming of a foreign substance on the basis of a comparing result of a changing amount of the rotational speed of a motor for opening and closing a window and a predetermined threshold value, and controlling the operation of the motor so as to open the window when there is jamming, the threshold value is constructed by a first threshold value at a normal time and a second threshold value as a reference gentler than this first threshold value. The threshold value is changed from the first threshold value to the second threshold value on the basis of the detection of closing of a door. The threshold value is returned from the second threshold value to the first threshold value on the basis of the detection of the rotation of the motor by a predetermined rotating amount in a state in which the threshold value is set to the second threshold value.

2 Claims, 15 Drawing Sheets

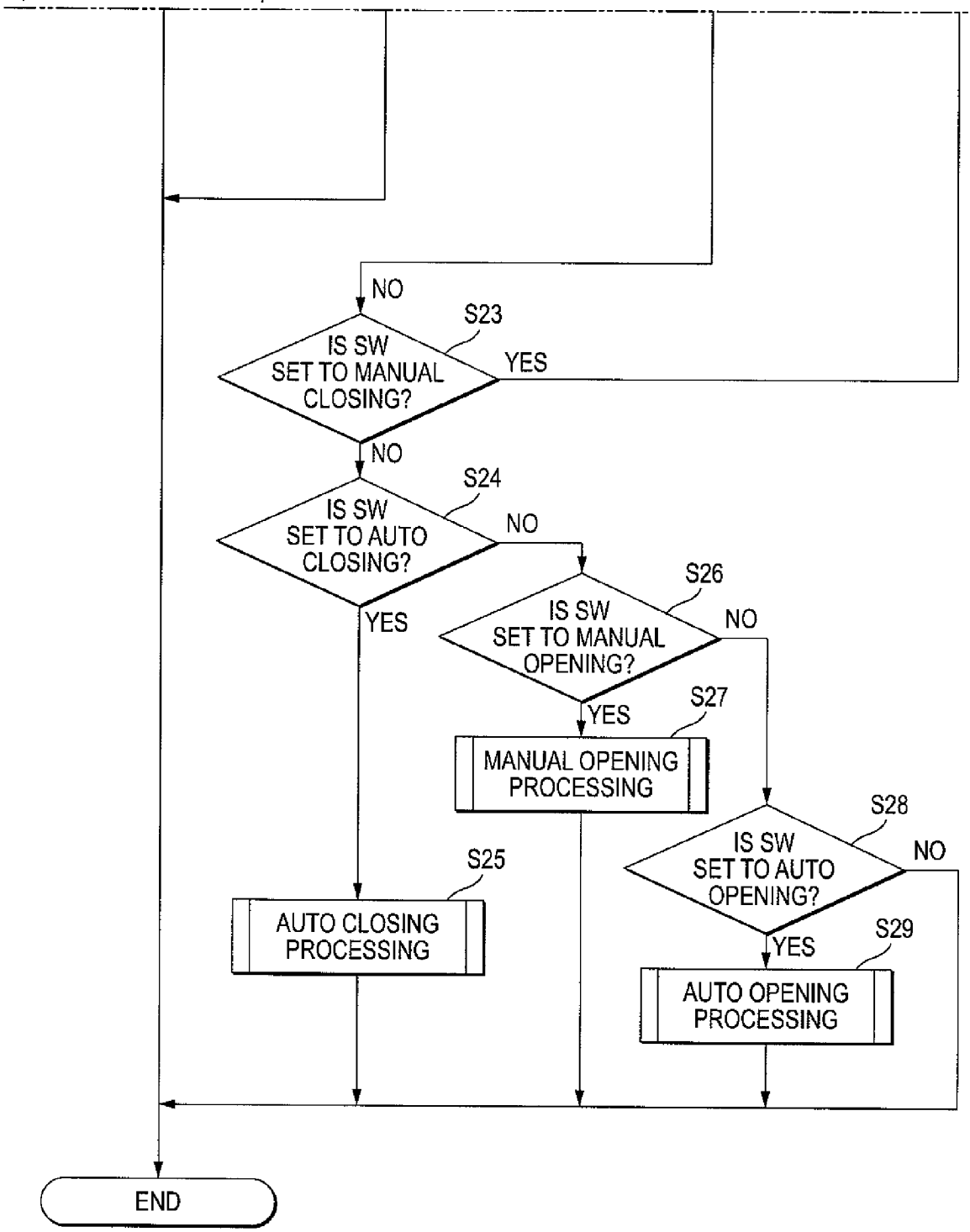

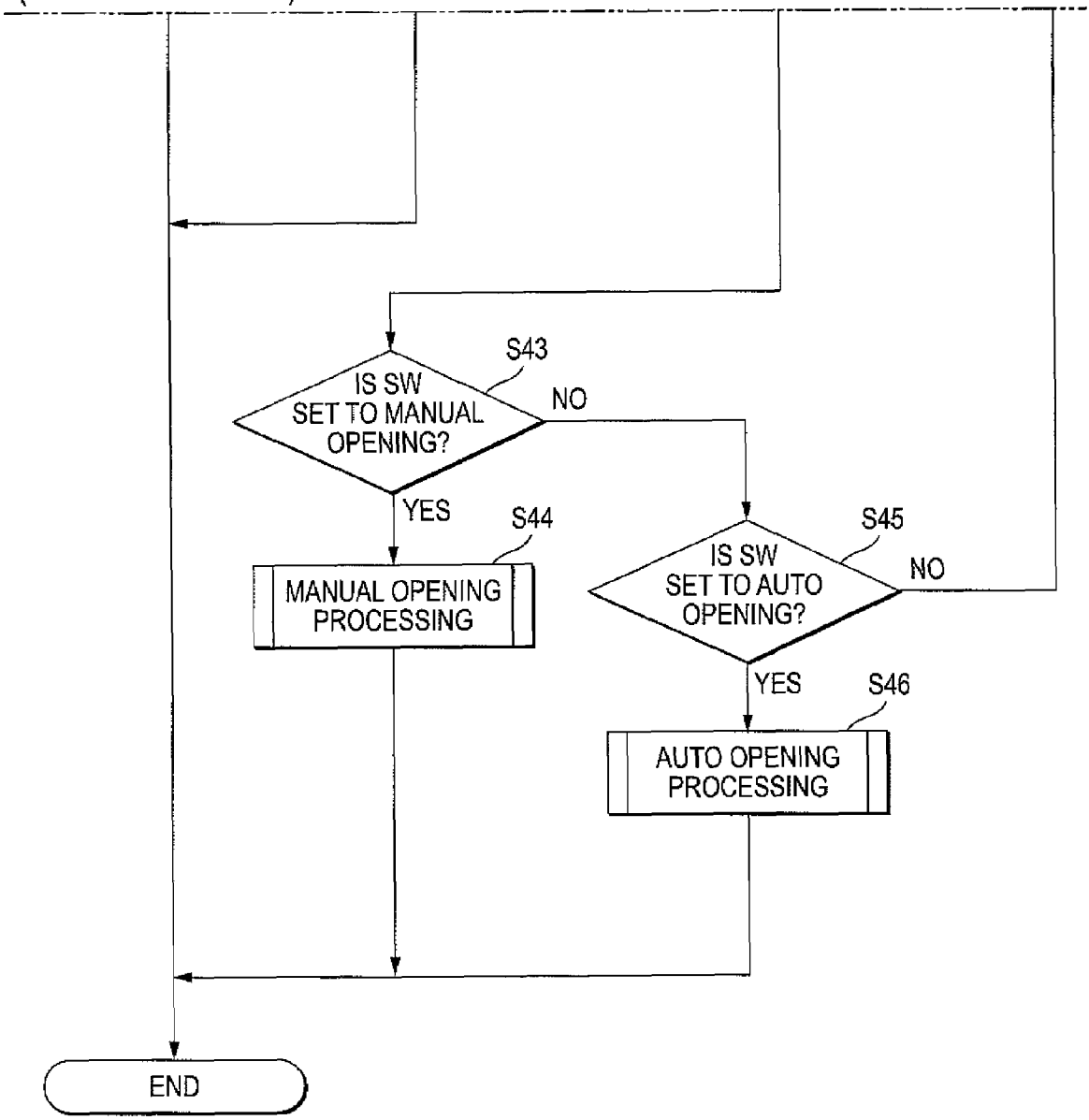

(FIG.8 CONTINUED)
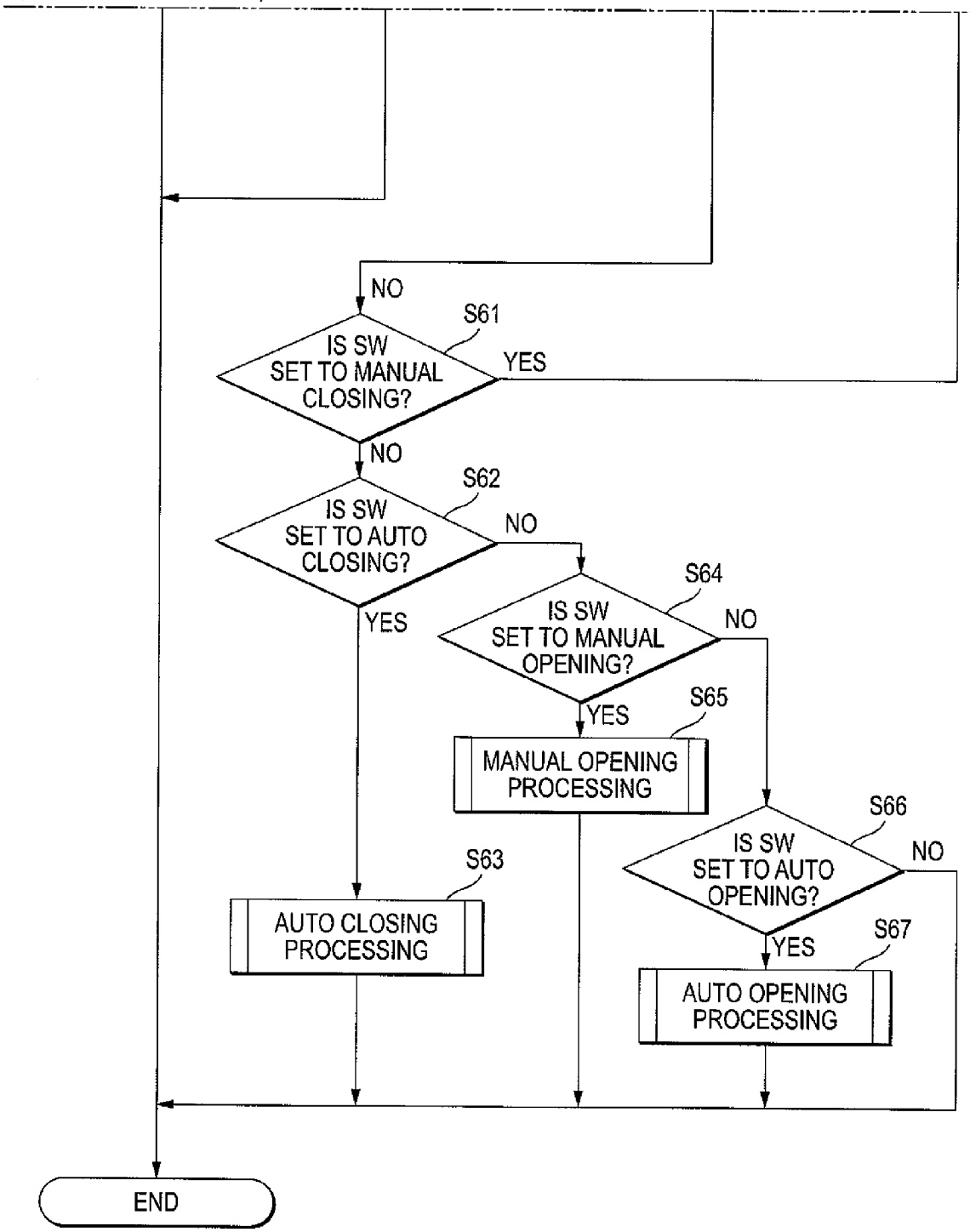

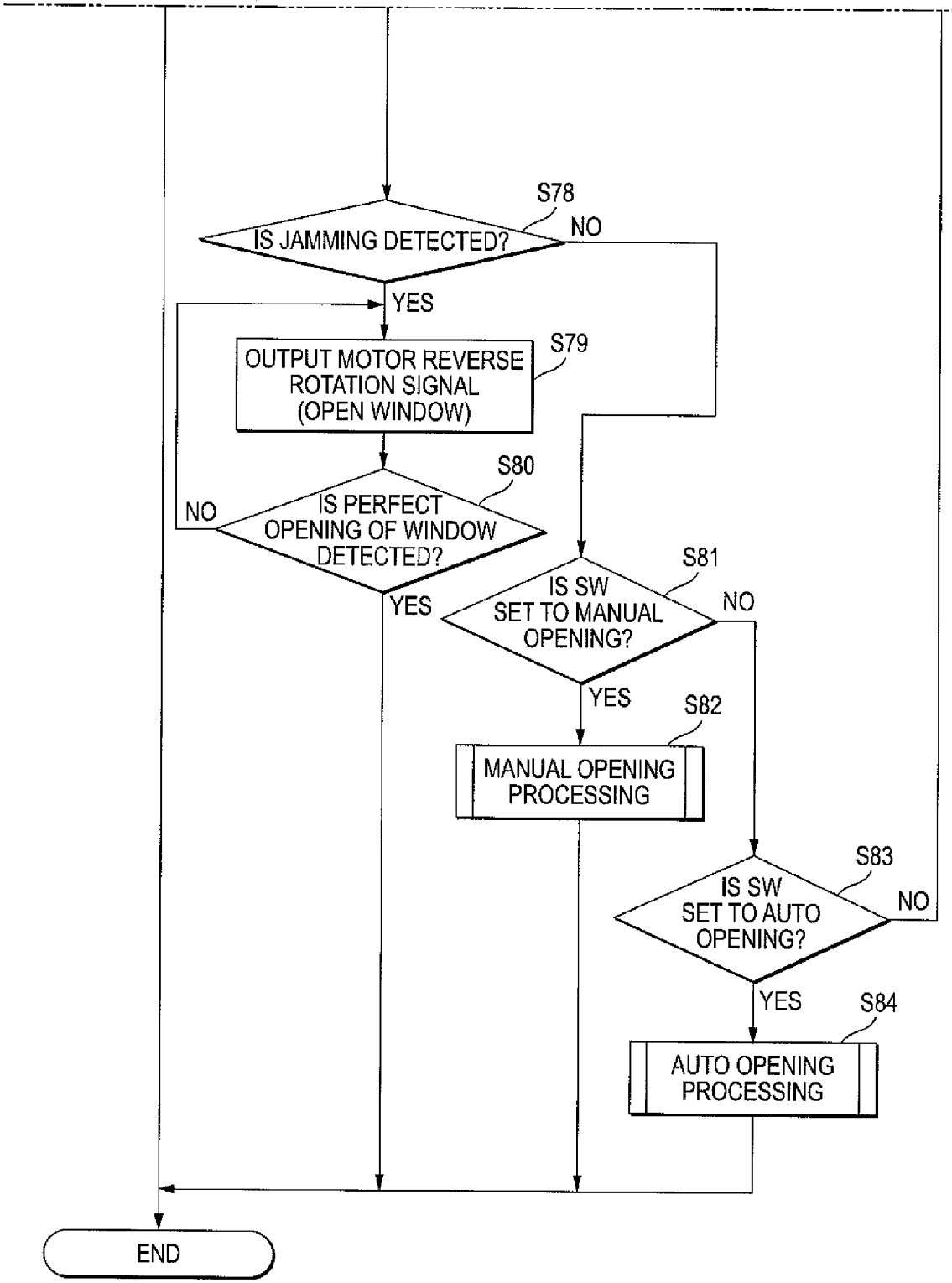

WINDOW OPENING AND CLOSING CONTROLLER

CROSS-REFERENCE TO RELATED APPLICATIONS

This is a continuation application of U.S. patent application Ser. No. 11/386,052 filed Mar. 21, 2006, which claims priority to JP2005/187688, filed Jun. 28, 2005.

BACKGROUND OF THE INVENTION

1. Field of the Invention

The present invention relates to a window opening and closing controller for controlling opening and closing of a window of a vehicle, etc.

2. Description of Related Art

The window opening and closing controller (hereinafter called a "power window device") used in an automobile is a device for raising and lowering a window glass of a door and opening and closing the window by rotating a motor in the normal and reverse directions by the operation of a switch. FIG. 1 is a block diagram showing the electric construction of the power window device. Reference numerals 1, 2 and 4 respectively designate an operation switch for performing the opening and closing operations of the window, a motor driving circuit for driving a motor 3, and a rotary encoder for outputting a pulse synchronized with the rotation of the motor 3. Reference numerals 5, 6 and 7 respectively designate a pulse detecting circuit for detecting the pulse outputted from the rotary encoder 4, a memory constructed from a ROM, a RAM, etc., and a door closing detecting switch for detecting the closing of the door. Reference numerals 8 and 9 respectively designate an acceleration sensor for detecting acceleration due to a vibration and an impact applied to a vehicle body, and a control section constructed by a CPU for controlling the opening and closing operations of the window.

When the operation switch 1 is operated, a window opening and closing command is given to the control section 9, and the motor 3 is rotated by the motor driving circuit 2 in the normal or reverse direction. A window opening and closing mechanism is operated in association with the motor 3 by rotating the motor 3 so that the window is opened and closed. The pulse detecting circuit 5 detects the pulse outputted from the rotary encoder 4. The control section 9 calculates the opening and closing amount of the window and a motor speed on the basis of this detecting result, and controls the rotation of the motor 3 through the motor driving circuit 2.

FIG. 2 is a schematic construction view showing one example of the operation switch 1. The operation switch 1 is constructed from an operation knob 11 able to be rotated in the ab direction with a shaft Q as a center, a rod 12 arranged integrally with this operation knob 11, and a publicly known slide switch 13. Reference numerals 14 and 20 respectively designate an actuator of the slide switch 13, and a cover of a switch unit into which the operation switch 1 is assembled. The lower end of the rod 12 is engaged with the actuator 14 of the slide switch 13. When the operation knob 11 is rotated in the ab direction, the actuator 14 is moved in the cd direction through the rod 12, and an unillustrated contact of the slide switch 13 is switched in accordance with its moving position.

The operation knob 11 can be switched to the respective positions of auto closing AC, manual closing MC, neutral N, manual opening MO and auto opening AO. FIG. 2 shows a state in which the operation knob 11 is located in the position of neutral N. When the operation knob 11 is rotated by a constant amount from this position to the a-direction and is set to the position of manual closing MC, a manual closing operation for closing the window by a manual operation is performed. When the operation knob 11 is further rotated in the a-direction from this position and is set to the position of auto closing AC, an auto closing operation for closing the window by an auto operation is performed. Further, when the operation knob 11 is rotated by a constant amount from the position of neutral N in the b-direction and is set to the position of manual opening MO, a manual opening operation for opening the window by a manual operation is performed. When the operation knob 11 is further rotated from this position in the b-direction and is set to the position of auto opening AO, an auto opening operation for opening the window by an auto operation is performed. An unillustrated spring is arranged in the operation knob 11. When a hand is separated from the rotated operation knob 11, the operation knob 11 is returned to the position of neutral N by the force of the spring.

In the case of the manual operation, the operation for closing or opening the window is performed only while the operation knob 11 is manually held continuously in the position of manual closing MC or manual opening MO. When the hand is separated from the operation knob 11 and the knob is returned to the position of neutral N, the closing operation or the opening operation of the window is stopped. On the other hand, in the case of the auto operation, when the operation knob 11 is once rotated until the position of auto closing AC or auto opening AO, the closing operation or the opening operation of the window is thereafter continuously performed even when the hand is separated from the operation knob 11 and the knob is returned to the position of neutral N.

FIG. 3 is a view showing one example of the window opening and closing mechanism arranged in each window of the vehicle. Reference numerals 100, 101 and 102 respectively designate a window of an automobile, a window glass for opening and closing the window 100, and the window opening and closing mechanism. The window glass 101 is raised and lowered by operating the window opening and closing mechanism 102. The window 100 is closed by raising the window glass 101, and is opened by lowering the window glass 101. In the window opening and closing mechanism 102, reference numeral 103 designates a support member attached to the lower end of the window glass 101. Reference numerals 104 and 105 respectively designate a first arm and a second arm. One end of the first arm 104 is engaged with the support member 103, and the other end of the first arm 104 is rotatably supported by a bracket 106. One end of the second arm 105 is engaged with the support member 103, and the other end of the second arm 105 is engaged with a guide member 107. The first arm 104 and the second arm 105 are connected through a shaft in their intermediate portions. Reference numerals 3 and 4 respectively designate the above motor and the above rotary encoder. The rotary encoder 4 is connected to the rotating shaft of the motor 3, and outputs pulses of a number proportional to the rotating amount of the motor 3. The rotational speed of the motor 3 can be detected by counting the number of pulses outputted from the rotary encoder 4 within a predetermined time. The rotating amount of the motor 3 (the moving amount of the window glass 101) can be calculated from the output of the rotary encoder 4.

Reference numerals 109 and 110 respectively designate a pinion rotated and operated by the motor 3, and a gear of a fan shape engaged with the pinion 109 and rotated. The gear 110 is fixed to the first arm 104. The motor 3 can be rotated in the normal and reverse directions. The pinion 109 and the gear 110 are rotated by rotating the motor 3 in the normal and reverse directions so that the first arm 104 is rotated in the normal and reverse directions. In connection with this rotation, the other end of the second arm 105 is slid in the transversal direction along a groove of the guide member 107, and the support member 103 is moved in the vertical direction. Thus, the window glass 101 is raised and lowered and the window 100 is opened and closed.

When the operation knob 11 is located in the position of auto closing AC of FIG. 2 and the auto closing operation is performed, the above power window device has a function for detecting jamming of an object. Namely, as shown in FIG. 4, when the object Z is jammed into a clearance of the window glass 101 during the closing of the window 100, this jamming is detected and the closing operation of the window 100 is stopped or switched to the opening operation. The window 100 is automatically closed during the auto closing operation. Therefore, when a hand, a neck, etc. are jammed in error, such a jamming detecting function is arranged from the necessity of inhibiting the closing operation and preventing that an injury is inflicted on a human being. In the detection of the jamming, the control section 9 reads the rotational speed of the motor 3 as the output of the pulse detecting circuit 5 at any time, and compares the present rotational speed and the previous rotational speed, and judges the existence of the jamming on the basis of this comparing result. When the jamming of the object Z is generated in the window 100, the load of the motor 3 is increased and the rotational speed is reduced so that the changing amount of the speed is increased. When this speed changing amount exceeds a predetermined threshold value, the control section 9 judges that the object Z is jammed. The threshold value is stored to the memory 6 in advance.

The change of the rotational speed of the motor 3 is also generated by a vibration at the closing time of the door as well as the jamming of a foreign substance. When the rotational speed is changed by such a vibration, a case in which it is judged in error as the jamming of the foreign substance and the window is opened, might be caused although no foreign substance is jammed. As this countermeasure, it is considered to highly set the threshold value for judging the jamming. However, when the threshold value is merely raised, the load (hereinafter called "jamming load") at a detecting time point of the jamming is increased by the raising amount of the threshold value. Therefore, a problem exists in that safety is reduced when a hand, an arm, etc. are jammed.

Therefore, in Japanese Patent No. 3156553 (patent literature 1), a power window device is proposed as a solving countermeasure of this problem. In this power window device, the threshold value is raised for only a constant time from the detection of the closing of the door. Thus, at the closing operation time of the door, no speed changing amount exceeds the threshold value and the erroneous judgment is prevented even when the rotational speed of the motor is changed by a vibration. After the constant time has passed from the closing of the door, the threshold value is returned to the original threshold value so that the normal jamming detection is performed. In Japanese Patent No. 3237519 (patent literature 2), a similar technique is also disclosed. In a power window device described in Japanese Patent No. 3237520 (patent literature 3), a road surface state is judged on the basis of the change of a pulse period according to the speed of the motor. When it is judged that the vehicle is running a bad road, the threshold value is changed so as not to generate the erroneous judgment of the jamming due to a vibration during the bad road running.

Power voltage supplied from a battery arranged in the automobile is generally not constant, but is changed in accordance with the state of an engine. Namely, the power voltage at a stopping time of the engine is e.g., 12 V. In contrast to this, the power voltage at an operating time of the engine is raised to e.g., 14.5 V. The rotation number of the motor depends on the power voltage. As the power voltage is raised, the rotation number is increased. Accordingly, in the system for raising the threshold value for only a predetermined time from the closing of the door as in patent literatures 1 and 2, the rotating amount of the motor is increased when the power voltage is high. The moving amount of the window glass is increased while a predetermined time has passed. Therefore, a problem exists in that the jamming load is increased and the jammed foreign substance is easily damaged. No countermeasures with respect to this problem are described in patent literatures 1 to 3.

SUMMARY OF THE INVENTION

Therefore, an object of the invention is to provide a window opening and closing controller for stably detecting the jamming without having any influence on the jamming load even when the power voltage is changed.

The invention resides in a window opening and closing controller comprising detecting means for detecting the rotational speed of a motor for opening and closing a window: judging means for judging whether or not a foreign substance is jammed into the window on the basis of a comparing result of a changing amount of the rotational speed detected by the detecting means and a predetermined threshold value; and control means for controlling the operation of the motor so as not to close the window when it is judged by this judging means that the foreign substance is jammed. The threshold value is constructed by a first threshold value at a normal time and a second threshold value as a reference gentler than this first threshold value. The window opening and closing controller further comprises threshold value changing means for changing the threshold value from the first threshold value to the second threshold value on the basis of the detection of closing of an opening and closing portion of a door, etc.; and threshold value returning means for returning the threshold value from the second threshold value to the first threshold value on the basis of the detection of the rotation of the motor by a predetermined rotating amount in a state in which the threshold value is set to the second threshold value.

The window opened and closed by the motor is typically a window of a vehicle, but may be also a sunroof. The opening and closing portion includes a rear portion door and a bonnet, etc. in addition to the door (including a slide door). The rotational speed of the motor may be detected by counting the number of pulses generated within a constant time in synchronization with the rotation of the motor, and may be also detected by measuring the period of this pulse. The changing amount of the rotational speed may be the difference between the present rotational speed and the past rotational speed, and may be also a changing ratio of the present rotational speed with respect to the past rotational speed. Further, when the operation of the motor is controlled so as not to close the window at the detecting time of jamming, the window may be opened by reversely rotating the motor, and it may be also inhibited by stopping the operation of the motor that the window is closed. Otherwise, after it is once inhibited by stopping the operation of the motor that the window is closed, the window may be also opened by reversely rotating the motor. The first threshold value and the second threshold value are not limited to a fixing value, but may be also set to a value having a constant width. Accordingly, for example, when the threshold value is returned from the second threshold value to the first threshold value by the threshold value returning means, the first threshold value after the return may be also a value different from the original first threshold value.

In the invention, the raising period of the threshold value is set to a period according to the rotating amount of the motor instead of a constant period as in the above patent literatures 1 and 2. Therefore, even when the rotating amount of the motor is increased by raising power voltage, the threshold value is returned to the original threshold value when the motor is rotated by the predetermined amount. Accordingly, no jamming load is unnecessarily increased and damage of a jammed foreign substance can be prevented.

In the invention, the closing of the opening and closing portion of the door, etc. can be detected by a detecting switch. In this case, the threshold value changing means changes the threshold value from the first threshold value to the second threshold value when a detecting signal is outputted from the detecting switch. Further, the threshold value returning means returns the threshold value from the second threshold value to the first threshold value on the basis of the detection of the rotation of the motor by the predetermined rotating amount after the threshold value is changed. For example, the detecting switch may be also used as a courtesy lamp switch. A dedicated detecting switch may be also used.

The closing of the opening and closing portion of the door, etc. may be also detected by using an acceleration sensor instead of the detecting switch. In this case, the threshold value changing means changes the threshold value from the first threshold value to the second threshold value when the acceleration sensor detects a constant acceleration or more. Further, the threshold value returning means returns the threshold value from the second threshold value to the first threshold value on the basis of the detection of the rotation of the motor by the predetermined rotating amount after no acceleration sensor detects the constant acceleration or more.

In accordance with the invention, there is no influence on the jamming load even when the power voltage is changed. Therefore, stable jamming detection can be performed and the damage of a jammed foreign substance can be prevented.

DESCRIPTION OF PREFERRED EMBODIMENTS

Figure 1:
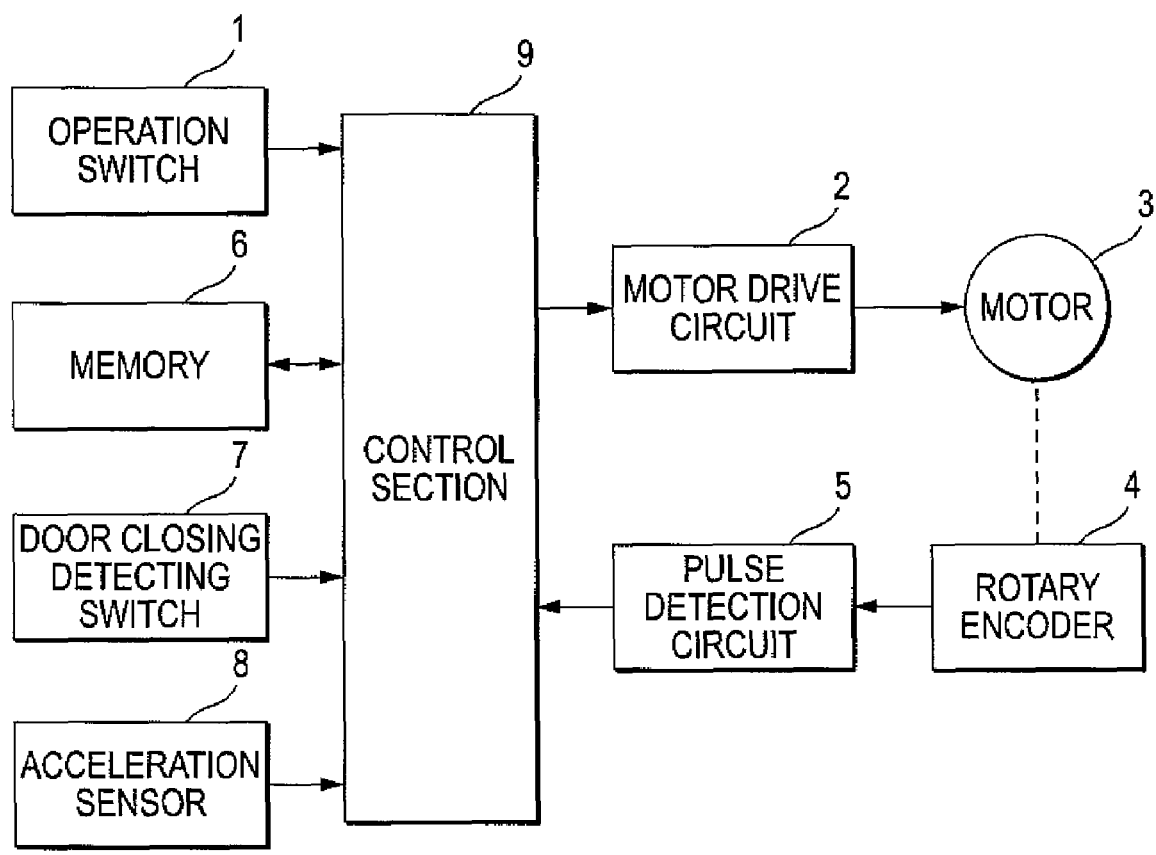
FIG. 1 is a block diagram showing the electric construction of a power window device as an embodiment mode of the invention.
Figure 2:
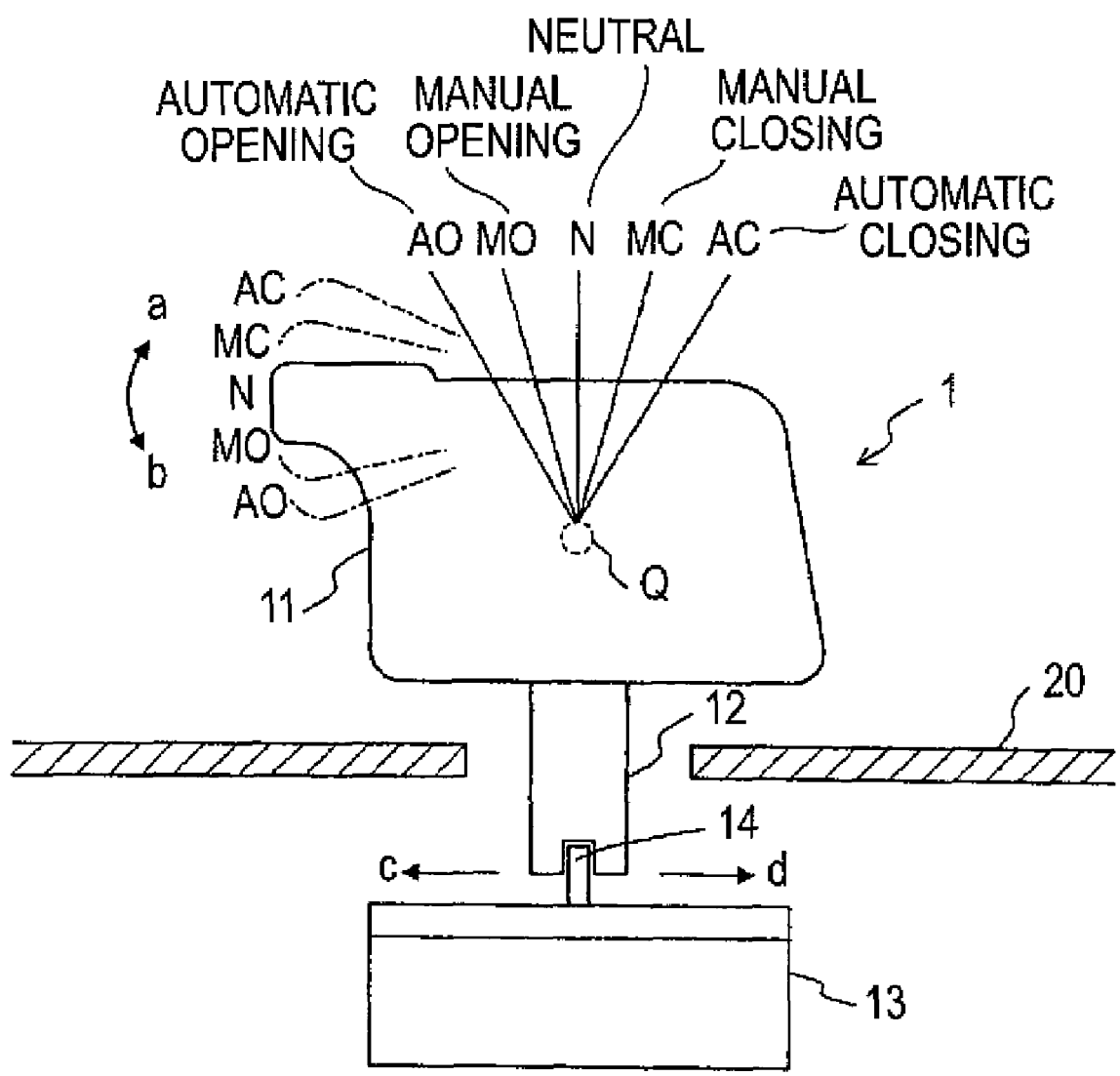
FIG. 2 is a schematic construction view showing one example of an operation switch.
Figure 3:
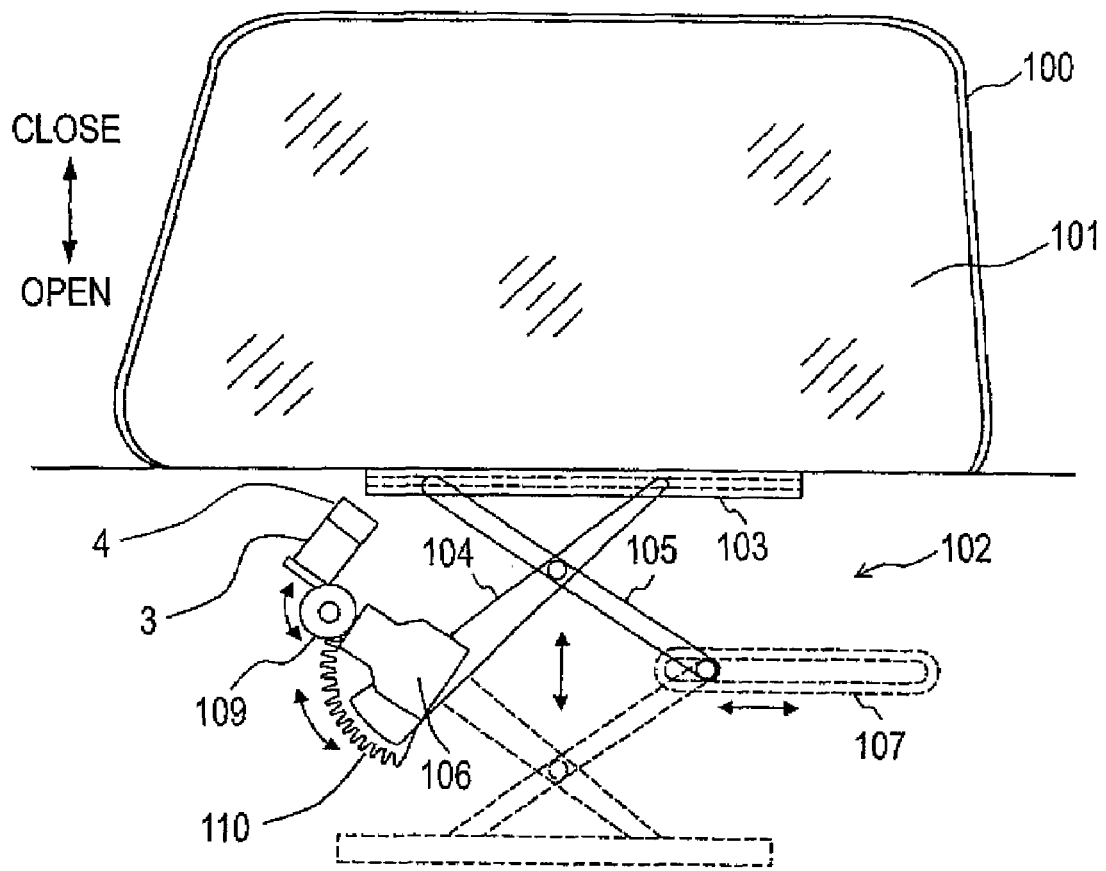
FIG. 3 is a view showing one example of a window opening and closing mechanism.
Figure 4:
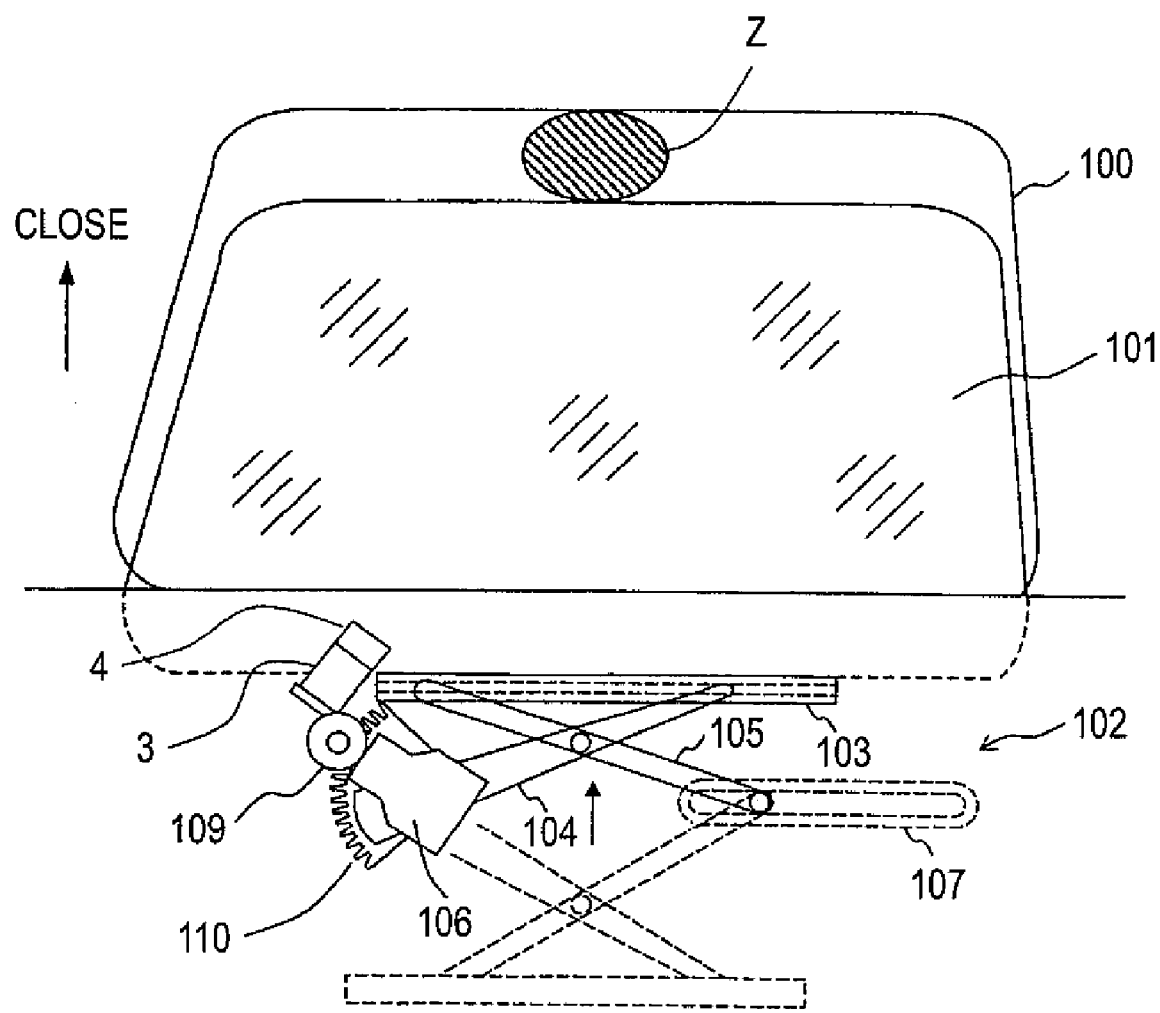
FIG. 4 is a view showing a state in which an object is jammed into a window.

An embodiment mode of the invention will next be explained with reference to the drawings. In the following description, FIGS. 1 to 4 explained in the column of the background art are cited as the embodiment mode of the invention. FIG. 1 is a block diagram showing the electric construction of a power window device as the embodiment mode of the invention. A first threshold value and a second threshold value described later are stored to a memory 6. A control section 9 constitutes judging means, control means, threshold value changing means and threshold value returning means in the invention. A rotary encoder 4 and a pulse detecting circuit 5 constitute detecting means in the invention. FIG. 2 is a schematic construction view showing one example of an operation switch. FIG. 3 is a view showing one example of a window opening and closing mechanism arranged in each window of a vehicle. FIG. 4 is a view showing a state in which an object is jammed into the window in FIG. 3. Each of these figures has been already explained and its overlapping explanation is therefore omitted here.

Figure 5:
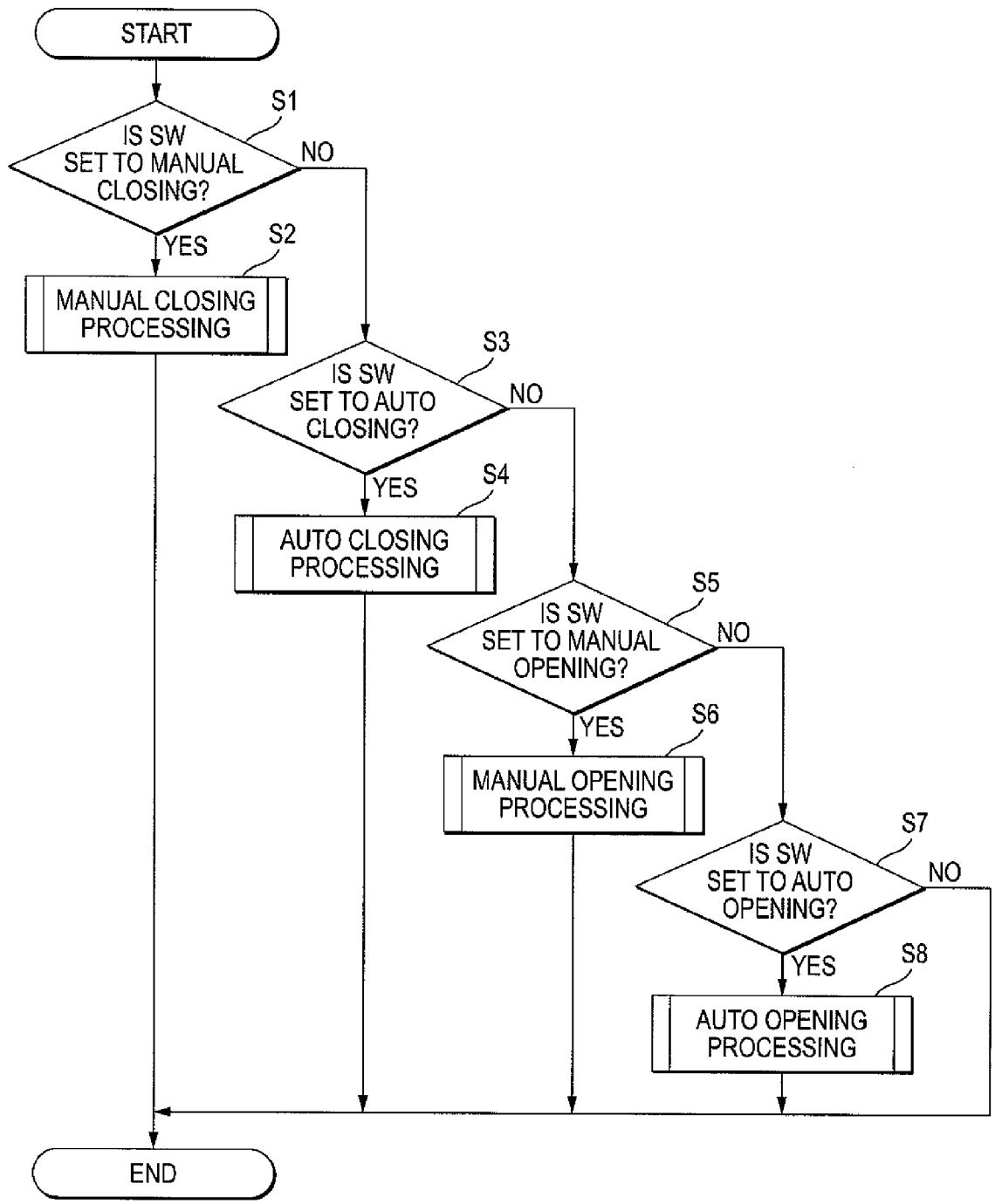
FIG. 5 is a flow chart showing a basic operation of the power window device.

FIG. 5 is a flow chart showing a basic operation of the power window device in accordance with the embodiment mode of the invention. If the operation switch 1 is located in the position of manual closing MC in a step S1, the processing of a manual closing operation is performed (step S2). If the operation switch 1 is located in the position of auto closing AC in a step S3, the processing of an auto closing operation is performed (step S4). If the operation switch 1 is located in the position of manual opening MO in a step S5, the processing of a manual opening operation is performed (step S6). If the operation switch 1 is located in the position of auto opening AO in a step S7, the processing of an auto opening operation is performed (step S8). Further, if no operation switch 1 is located in the position of auto opening AO in the step S7, the operation switch 1 is located in the position of neutral N and no processing is performed. The details of steps S2, S4, S6 and S8 will next be sequentially explained.

Figure 6:
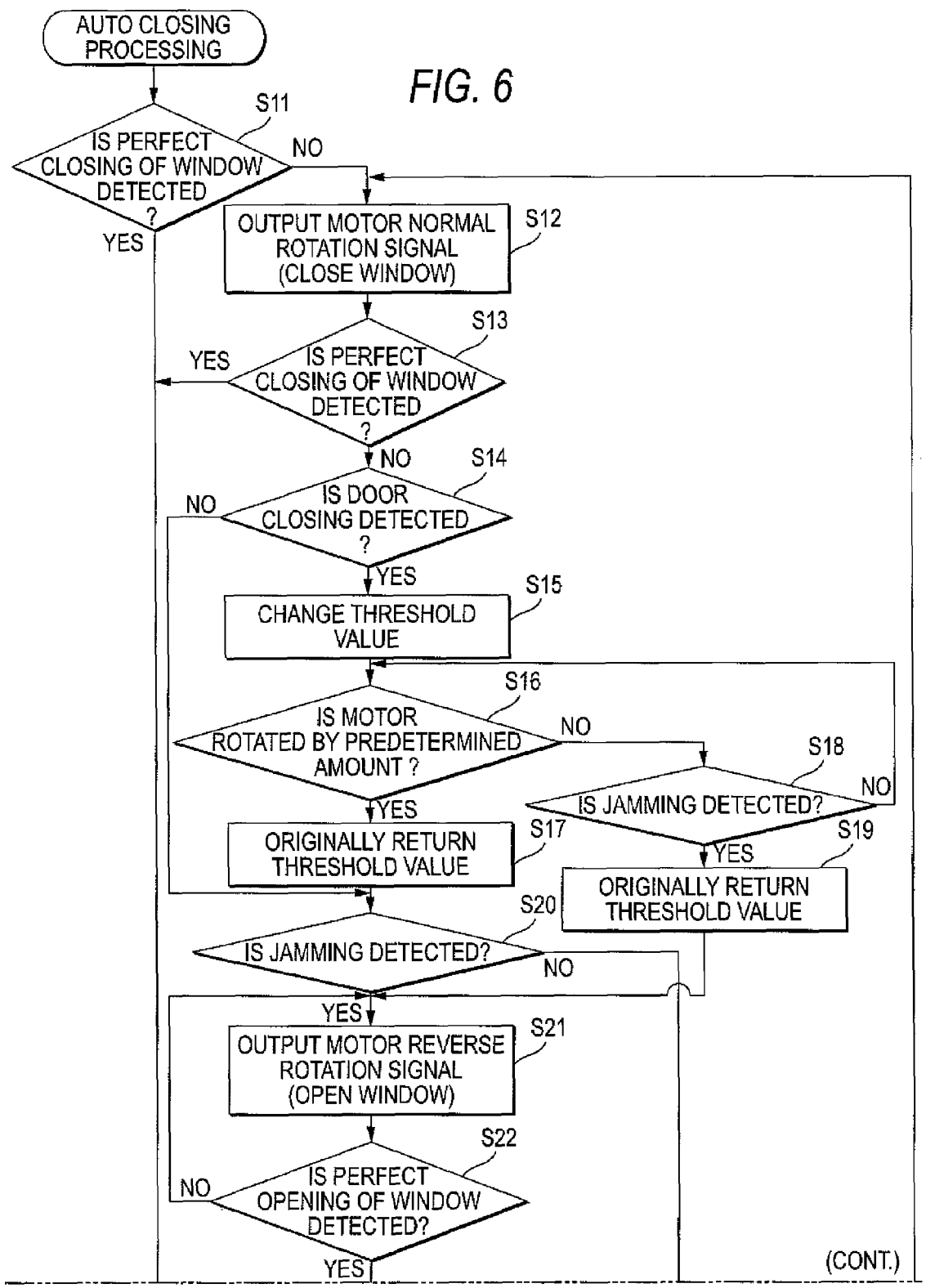
FIG. 6 is a flow chart showing a detailed procedure of manual closing processing in a first embodiment mode.
Figure 7:
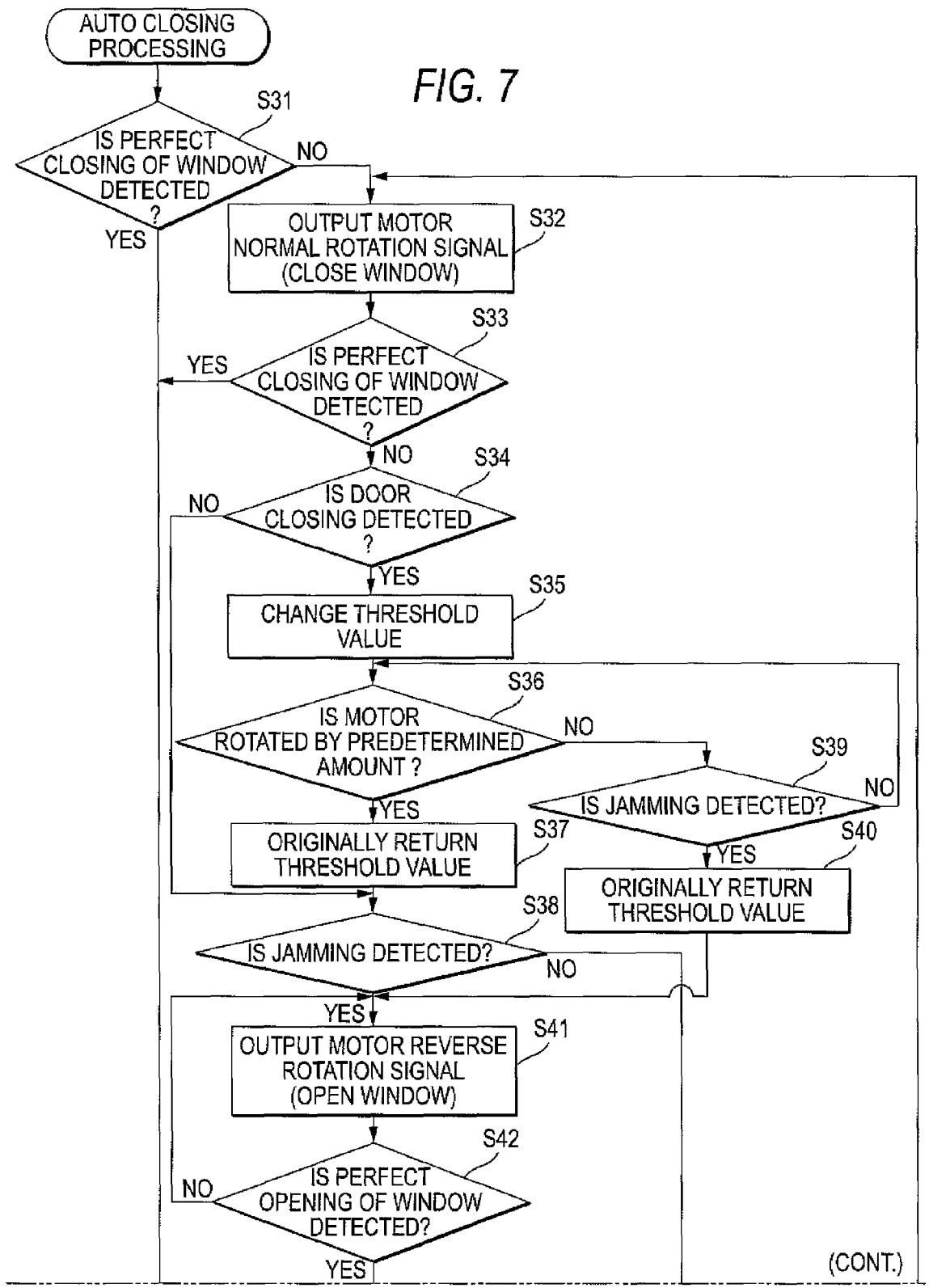
FIG. 7 is a flow chart showing a detailed procedure of auto closing processing in the first embodiment mode.

FIGS. 6 and 7 are flow charts showing the operation of the power window device in accordance with a first embodiment mode of the invention. FIG. 6 shows a detailed procedure of the manual closing operation in the step S2 of FIG. 5. FIG. 7 shows a detailed procedure of the auto closing operation in the step S4 of FIG. 5. In the first embodiment mode, closing of a door is detected by a door closing detecting switch 7. As this door closing detecting switch 7, it is possible to use a courtesy lamp switch for controlling turning-on of a lamp within the vehicle in association with the opening and closing of the door.

The procedure of the manual closing operation of FIG. 6 will first be explained. This procedure is executed by a CPU constituting the control section 9. First, it is judged whether a window 100 is perfectly closed by the manual closing operation or not on the basis of an output of the rotary encoder 4 (step S11). If the window 100 is perfectly closed (step S11: YES), the processing is terminated. In contrast to this, if no window 100 is perfectly closed (step S11: NO), a normal rotation signal is outputted from a motor driving circuit 2 and a motor 3 is rotated in the normal direction and the window 100 is closed (step S12). Subsequently, it is judged whether the window 100 is perfectly closed or not (step S13). If the window 100 is perfectly closed (step S13: YES), the processing is terminated. In contrast to this, if no window 100 is perfectly closed (step S13: NO), it is judged whether the door closing detecting switch 7 detects the door closing or not (step S14). When a detecting signal (door closing signal) is outputted from the door closing detecting switch 7, it is judged that the door is closed. In contrast to this, when no detecting signal is outputted from the door closing detecting switch 7, it is judged that no door is closed.

When no door closing detecting switch 7 detects the door closing in the step S14 (step S14: NO), it proceeds to a step S20 and it is judged whether jamming is detected or not. In this detection of jamming, as mentioned above, the rotational speed of the motor 3 is calculated on the basis of the output of a pulse detecting circuit 5. When a changing amount of the rotational speed exceeds a predetermined threshold value, it is judged that there is jamming.

Here, the threshold value is constructed by a first threshold value at the normal time and a second threshold value as a reference gentler than this first threshold value. The second threshold value is a value judged as jamming when the load applied to the window 100 is larger in comparison with the first threshold value. For example, when the value of jamming load is used as the threshold value, the second threshold value is set to be larger than the first threshold value. As this result, when the jamming judgment is made by using the first threshold value, it is judged as jamming if the load applied to the window 100 exceeds the first threshold value. However, when the jamming judgment is made by using the second threshold value, it is not judged as jamming even when the load applied to the window 100 exceeds the first threshold value. It is judged as jamming for the first time when this load exceeds the second threshold value. Each of these threshold values is stored to the memory 6 in advance. The first threshold value is used in the jamming detection of the step S20.

When an object Z is jammed as shown in FIG. 4 (step S20: YES), a reverse rotation signal is outputted from the motor driving circuit 2 and the motor 3 is rotated in the reverse direction and the window 100 is opened (step S21). Thus, the jamming is released. It is then judged whether the window 100 is perfectly opened or not (step S22). If the window 100 is perfectly opened (step S22: YES), the processing is terminated. In contrast to this, if no window 100 is perfectly opened (step S22: NO), it is returned to the step S21 and the reverse rotation of the motor 3 is continued.

When no jamming is detected in the step S20 (step S20: NO), it is judged whether the operation switch 1 is located in the position of manual closing MC or not (step S23). If the operation switch 1 is located in the position of manual closing MC (step S23: YES), it is returned to the step S12 and the normal rotation of the motor 3 is continued. In contrast to this, if no operation switch 1 is located in the position of manual closing MC (step S23: NO), it is judged whether the operation switch 1 is located in the position of auto closing AC or not (step S24). If the operation switch 1 is located in the position of auto closing AC (step S24: YES), it proceeds to auto closing processing described later (in FIG. 7) (step S25). In contrast to this, if no operation switch 1 is located in the position of auto closing AC (step S24: NO), it is judged whether the operation switch 1 is located in the position of manual opening MO or not (step S26). If the operation switch 1 is located in the position of manual opening MO (step S26: YES), it proceeds to manual opening processing described later (in FIG. 10) (step S27). In contrast to this, if no operation switch 1 is located in the position of manual opening MO (step S26: NO), it is judged whether the operation switch 1 is located in the position of auto opening AO or not (step S28). If the operation switch 1 is located in the position of auto opening AO (step S28: YES), it proceeds to auto opening processing described later (in FIG. 11) (step S29). In contrast to this, if no operation switch 1 is located in the position of auto opening AO (step S28: NO), it is terminated without performing any processing.

On the other hand, when the door closing detecting switch 7 detects the door closing in the step S14 (step S14: YES), the control section 9 changes the threshold value used in the jamming detection from the first threshold value to the second threshold value (step S15). After the threshold value is changed, it is judged whether the motor 3 is rotated by a predetermined amount or not (step S16).

If no motor 3 is rotated by the predetermined amount (step S16: NO), it proceeds to a step S18 and it is judged whether jamming is detected or not. This jamming is detected in accordance with a principle similar to that of the step S20, but the second threshold value is used in the jamming detection of the step S18. This second threshold value is a threshold value gentler than the first threshold value as mentioned above. Accordingly, even when there is a vibration due to the door closing by raising the threshold value, it is possible to prevent that this vibration is judged as jamming in error. If no jamming is detected in the step S18 (step S18: NO), it is returned to the step S16. In contrast to this, if jamming is detected (step S18: YES), the threshold value is returned from the second threshold value to the first threshold value (step S19). It then proceeds to the step S21 previously mentioned and the motor 3 is reversely rotated and the window is opened and the jamming is released.

On the other hand, if the motor 3 is rotated by a predetermined amount in the step S16 (step S16: YES), the threshold value is returned from the second threshold value to the first threshold value (step S17). It then proceeds to the above step S20 and the existence of jamming is judged on the basis of the first threshold value. The procedure after the step S20 has been already explained and its explanation is therefore omitted here.

Thus, in the procedure of FIG. 6, the threshold value is changed from the first threshold value to the second threshold value when the door closing is detected. Thereafter, when the motor 3 is rotated by the predetermined amount, the threshold value is returned from the second threshold value to the first threshold value (steps S14 to S17). Therefore, even when power voltage is raised and the rotating amount of the motor 3 is increased, the threshold value is returned to the original threshold value when the motor 3 is rotated by the predetermined amount. Accordingly, the jamming detection using the normal threshold value is performed from a time point at which a window glass 101 is raised until a predetermined position. As this result, no jamming load is unnecessarily increased and the damage of a jammed object Z can be prevented.

Next, the procedure of the auto closing operation of FIG. 7 will be explained. This procedure is executed by a CPU constituting the control section 9. First, it is judged whether the window 100 is perfectly closed by the auto closing operation or not on the basis of the output of the rotary encoder 4 (step S31). If the window 100 is perfectly closed (step S31: YES), the processing is terminated. In contrast to this, if no window 100 is perfectly closed (step S31: NO), a normal rotation signal is outputted to the motor driving circuit 2 and the motor 3 is rotated in the normal direction and the window 100 is closed (step S32). Subsequently, it is judged whether the window 100 is perfectly closed or not (step S33). If the window 100 is perfectly closed (step S33: YES), the processing is terminated. In contrast to this, if no window 100 is perfectly closed (step S33: NO), it is judged whether the door closing detecting switch 7 detects the door closing or not (step S34). When a detecting signal (door closing signal) is outputted from the door closing detecting switch 7, it is judged that the door is closed. In contrast to this, when no detecting signal is outputted, it is judged that no door is closed.

When no door closing detecting switch 7 detects the door closing in the step S34 (step S34: NO), it proceeds to a step S38 and it is judged whether jamming is detected or not. In this detection of jamming, as mentioned above, the rotational speed of the motor 3 is calculated on the basis of the output of the pulse detecting circuit 5. When the changing amount of the rotational speed exceeds a predetermined threshold value, it is judged that there is jamming. The above first threshold value is used in the jamming detection of this step S38.

When the object Z is jammed as shown in FIG. 4 (step S38: YES), a reverse rotation signal is outputted from the motor driving circuit 2 and the motor 3 is reversely rotated and the window 100 is opened (step S41). Thus, the jamming is released. It is then judged whether the window 100 is perfectly opened or not (step S42). If the window 100 is perfectly opened (step S42: YES), the processing is terminated. In contrast to this, if no window 100 is perfectly opened (step S42: NO), it is returned to the step S41 and the reverse rotation of the motor 3 is continued.

When no jamming is detected in the step S38 (step S38: NO), it is judged whether the operation switch 1 is located in the position of manual opening MO or not (step S43). If the operation switch 1 is located in the position of manual opening MO (step S43: YES), it proceeds to manual opening processing described later (in FIG. 10) (step S44). In contrast to this, if no operation switch 1 is located in the position of manual opening MO (step S43: NO), it is judged whether the operation switch 1 is located in the position of auto opening AO or not (step S45). If the operation switch 1 is located in the position of auto opening AO (step S45: YES), it proceeds to auto opening processing described later (in FIG. 11) (step S46). In contrast to this, if no operation switch 1 is located in the position of auto opening AO (step S45: NO), it is returned to the step S32 and the normal rotation of the motor 3 is continued.

On the other hand, when the door closing detecting switch 7 detects the door closing in the step S34 (step S34: YES), the control section 9 changes the threshold value used in the jamming detection from the first threshold value to the second threshold value (step S35). After the threshold value is changed, the control section 9 judges whether the motor 3 is rotated by a predetermined amount or not (step S36).

If no motor 3 is rotated by the predetermined amount (step S36: NO), it proceeds to a step S39 and it is judged whether jamming is detected or not. This detection of jamming is performed in accordance with a principle similar to that of the step S38, but the second threshold value is used in the jamming detection of the step S39. This second threshold value is a threshold value gentler than the first threshold value as mentioned above. Since the threshold value rises, even when there is a vibration due to the door closing, it is possible to prevent that this vibration is judged as jamming in error. If no jamming is detected in the step S39 (step S39: NO), it is returned to the step S36. In contrast to this, if jamming is detected (step S39: YES), the threshold value is returned from the second threshold value to the first threshold value (step S40). It then proceeds to the step S41 previously mentioned and the motor 3 is reversely rotated and the window is opened and the jamming is released.

On the other hand, if the motor 3 is rotated by the predetermined amount in the step S36 (step S36: YES), the threshold value is returned from the second threshold value to the first threshold value (step S37). It then proceeds to the step S38 previously mentioned, and the existence of jamming is judged on the basis of the first threshold value. The procedure after the step S38 has been already explained, and its explanation is therefore omitted here.

Thus, in the procedure of FIG. 7, the threshold value is also changed from the first threshold value to the second threshold value when the door closing is detected. Thereafter, when the motor 3 is rotated by the predetermined amount, the threshold value is returned from the second threshold value to the first threshold value (steps S34 to S37). Therefore, even when the rotating amount of the motor 3 is increased by raising the power voltage, the threshold value is returned to the original threshold value when the motor 3 is rotated by the predetermined amount. Accordingly, the jamming detection using the normal threshold value is performed from a time point at which the window glass 101 is raised until a predetermined position. As this result, no jamming load is unnecessarily increased and the damage of a jammed object Z can be prevented.

Figure 8:
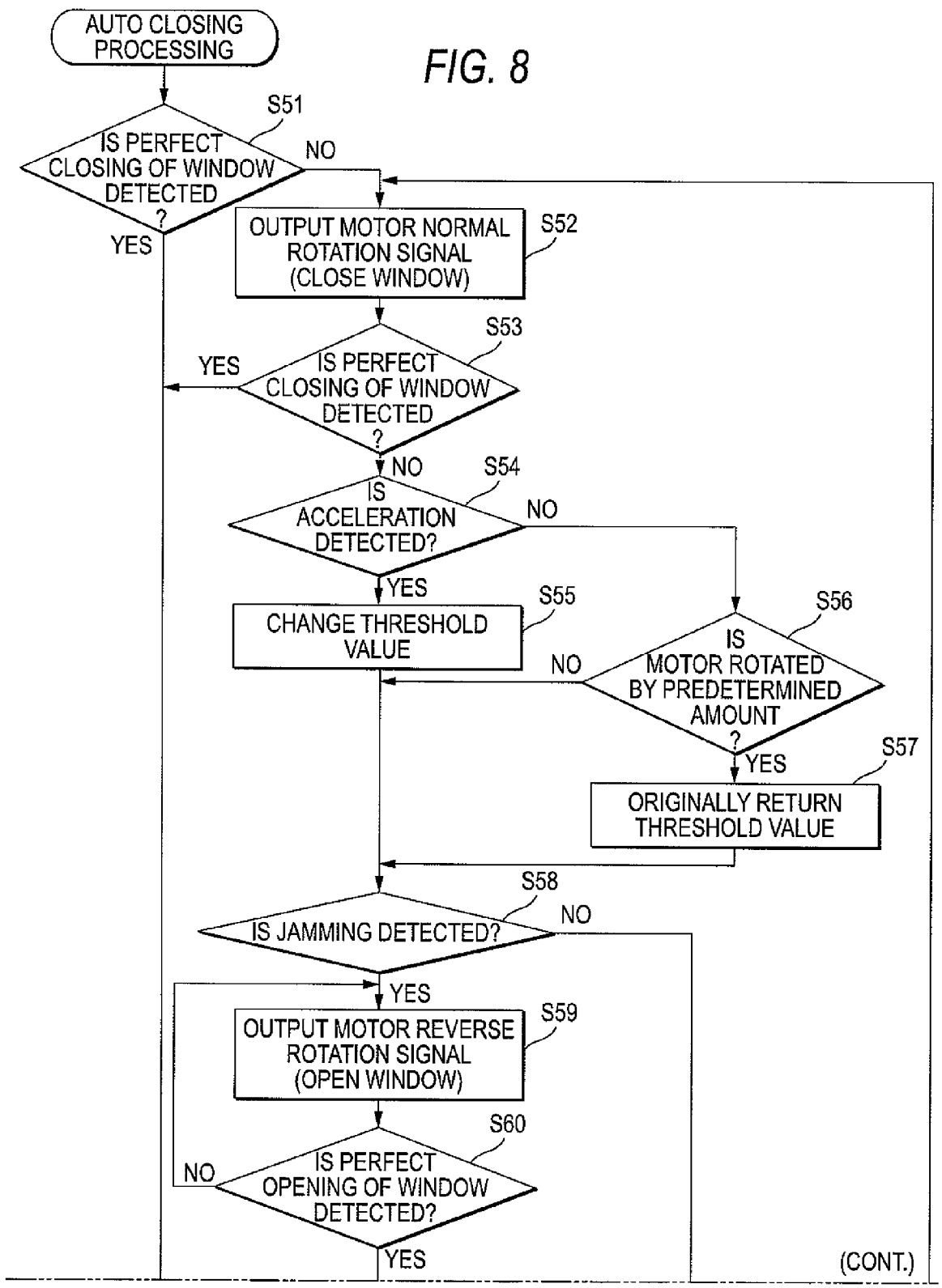
FIG. 8 is a flow chart showing a detailed procedure of the manual closing processing in a second embodiment mode.
Figure 9:
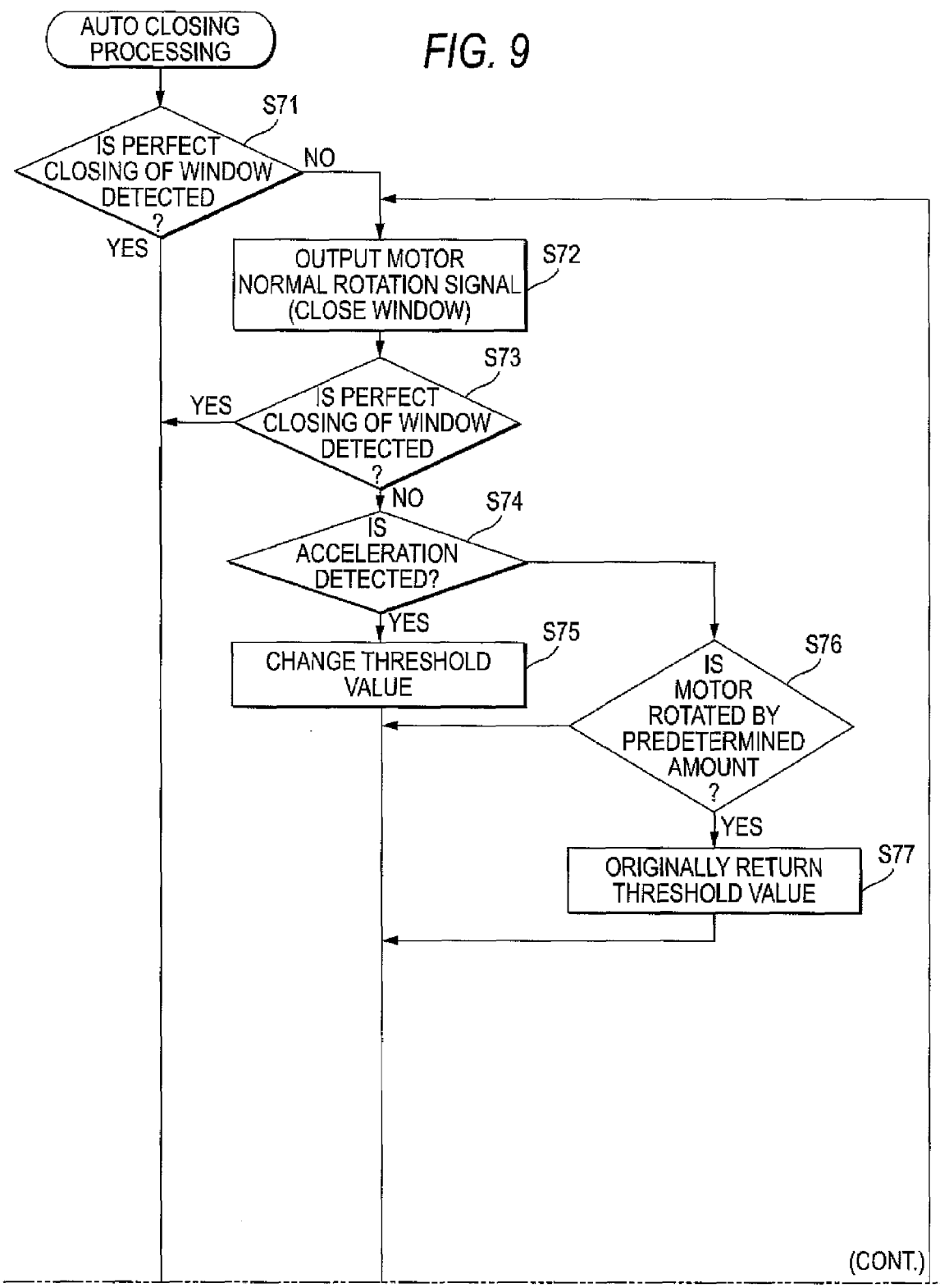
FIG. 9 is a flow chart showing a detailed procedure of the auto closing processing in the second embodiment mode.

FIGS. 8 and 9 are flow charts showing the operation of a power window device in accordance with a second embodiment mode of the invention. FIG. 8 shows a detailed procedure of the manual closing operation in the step S2 of FIG. 5. FIG. 9 shows a detailed procedure of the auto closing operation in the step S4 of FIG. 5. In the second embodiment mode, the closing of the door is detected by an acceleration sensor 8.

First, the procedure of the manual closing operation of FIG. 8 will be explained. This procedure is executed by the CPU constituting the control section 9. First, it is judged whether the window 100 is perfectly closed by the manual closing operation or not on the basis of the output of the rotary encoder 4 (step S51). If the window 100 is perfectly closed (step S51: YES), the processing is terminated. In contrast to this, if no window 100 is perfectly closed (step S51: NO), a normal rotation signal is outputted from the motor driving circuit 2 and the motor 3 is normally rotated and the window 100 is closed (step S52). Subsequently, it is judged whether the window 100 is perfectly closed or not (step S53). If the window 100 is perfectly closed (step S53: YES), the processing is terminated. In contrast to this, if no window 100 is perfectly closed (step S53: NO), it is judged whether or not the acceleration sensor 8 detects a constant acceleration or more (step S54). When the door is closed, the acceleration is applied to the vehicle body by a vibration generated at that time. The acceleration sensor 8 detects this acceleration over a predetermined time (several seconds).

When the acceleration sensor 8 detects the constant acceleration or more (step S54: YES), the control section 9 changes the threshold value used in the jamming detection from the first threshold value to the second threshold value (step S55). The control section 9 then judges whether jamming is detected or not on the basis of the changed second threshold value (step S58). This second threshold value is a threshold value gentler than the first threshold value as mentioned above. Since the threshold value rises, even when there is a vibration due to the door closing, it is possible to prevent that this vibration is judged as jamming in error.

When the acceleration sensor 8 detects the constant acceleration or more and then does not detect this acceleration (step S54: NO), it is judged whether the motor 3 is rotated by a predetermined amount or not (step S56). If no motor 3 is rotated by the predetermined amount (step S56: NO), it proceeds to a step S58 and the existence of jamming is detected. In contrast to this, when the motor 3 is rotated by the predetermined amount (step S56: YES), the threshold value is returned from the second threshold value to the first threshold value (step S57). It then proceeds to the step S58 and it is judged whether jamming is detected or not on the basis of the first threshold value. In the detection of jamming in the step S58, as mentioned above, the rotational speed of the motor 3 is calculated on the basis of the output of the pulse detecting circuit 5. When the changing amount of the rotational speed exceeds the first threshold value or the second threshold value, it is judged that there is jamming.

When there is jamming of the object Z as shown in FIG. 4 (step S58: YES), a reverse rotation signal is outputted from the motor driving circuit 2 and the motor 3 is reversely rotated and the window 100 is opened (step S59). Thus, the jamming is released. It is then judged whether the window 100 is perfectly opened or not (step S60). If the window 100 is perfectly opened (step S60: YES), the processing is terminated. In contrast to this, if no window 100 is perfectly opened (step S60: NO), it is returned to the step S59 and the reverse rotation of the motor 3 is continued.

When no jamming is detected in the step S58 (step S58: NO), it is judged whether the operation switch 1 is located in the position of manual closing MC or not (step S61). If the operation switch 1 is located in the position of manual closing MC (step S61: YES), it is returned to the step S52 and the normal rotation of the motor 3 is continued. In contrast to this, if no operation switch 1 is located in the position of manual closing MC (step S61: NO), it is judged whether the operation switch 1 is located in the position of auto closing AC or not (step S62). If the operation switch 1 is located in the position of auto closing AC (step S62: YES), it proceeds to auto closing processing described later (in FIG. 9) (step S63). In contrast to this, if no operation switch 1 is located in the position of auto closing AC (step S62: NO), it is judged whether the operation switch 1 is located in the position of manual opening MO or not (step S64). If the operation switch 1 is located in the position of manual opening MO (step S64: YES), it proceeds to manual opening processing described later (in FIG. 10) (step S65). In contrast to this, if no operation switch 1 is located in the position of manual opening MO (step S64: NO), it is judged whether the operation switch 1 is located in the position of auto opening AO or not(step S66). If the operation switch 1 is located in the position of auto opening AO (step S66: YES), it proceeds to auto opening processing described later (in FIG. 11) (step S67). In contrast to this, if no operation switch 1 is located in the position of auto opening AO (step S66: NO), it is terminated without performing any processing.

Thus, in the procedure of FIG. 8, when the constant acceleration or more is detected, the threshold value is changed from the first threshold value to the second threshold value. When the constant acceleration or more is not detected and the motor 3 is then rotated by the predetermined amount, the threshold value is returned from the second threshold value to the first threshold value (steps S54 to S57). Therefore, even when the rotating amount of the motor 3 is increased by raising the power voltage, the threshold value is returned to the original threshold value when the motor 3 is rotated by the predetermined amount. Accordingly, the jamming detection using the normal threshold value is performed from a time point at which the window glass 101 is raised until a predetermined position. As this result, no jamming load is unnecessarily increased and the damage of a jammed object Z can be prevented.

The procedure of the auto closing operation of FIG. 9 will next be explained. This procedure is executed by the CPU constituting the control section 9. First, it is judged whether the window 100 is perfectly closed by the auto closing operation or not on the basis of the output of the rotary encoder 4 (step S71). If the window 100 is perfectly closed (step S71: YES), the processing is terminated. In contrast to this, if no window 100 is perfectly closed (step S71: NO), a normal rotation signal is outputted to the motor driving circuit 2 and the motor 3 is normally rotated and the window 100 is closed (step S72). Subsequently, it is judged whether the window 100 is perfectly closed or not (step S73). If the window 100 is perfectly closed (step S73: YES), the processing is terminated. In contrast to this, if no window 100 is perfectly closed (step S73: NO), it is judged whether or not the acceleration sensor 8 detects a constant acceleration or more (step S74). When the door is closed, the acceleration is applied to the vehicle body by a vibration generated at that time. The acceleration sensor 8 detects this acceleration over a predetermined time (several seconds).

When the acceleration sensor 8 detects the constant acceleration or more (step S74: YES), the control section 9 changes the threshold value used in the jamming detection from the first threshold value to the second threshold value (step S75). It is then judged whether jamming is detected or not on the basis of the changed second threshold value (step S78). This second threshold value is a threshold value gentler than the first threshold value as mentioned above. Since the threshold value rises, even when there is a vibration due to the door closing, it is possible to prevent that this vibration is judged as jamming in error.

When the acceleration sensor 8 detects the constant acceleration or more and then does not detect this acceleration (step S74: NO), it is judged whether the motor 3 is rotated by a predetermined amount or not (step S76). If no motor 3 is rotated by the predetermined amount (step S76: NO), it proceeds to the step S78 and the existence of jamming is detected. In contrast to this, when the motor 3 is rotated by the predetermined amount (step S76: YES), the threshold value is returned from the second threshold value to the first threshold value (step S77). It then proceeds to the step S78 and it is judged whether jamming is detected or not on the basis of the first threshold value. In the detection of jamming in the step S78, as mentioned above, the rotational speed of the motor 3 is calculated on the basis of the output of the pulse detecting circuit 5. When the changing amount of the rotational speed exceeds the first threshold value or the second threshold value, it is judged that there is jamming.

When there is jamming of the object Z as shown in FIG. 4 (step S78: YES), a reverse rotation signal is outputted from the motor driving circuit 2 and the motor 3 is reversely rotated and the window 100 is opened (step S79). Thus, the jamming is released. It is then judged whether the window 100 is perfectly opened or not (step S80). If the window 100 is perfectly opened (step S80: YES), the processing is terminated. In contrast to this, if no window 100 is perfectly opened (step S80: NO), it is returned to the step S79 and the reverse rotation of the motor 3 is continued.

When no jamming is detected in the step S78 (step S78: NO), it is judged whether the operation switch 1 is located in the position of manual opening MO or not (step S81). If the operation switch 1 is located in the position of manual opening MO (step S81: YES), it proceeds to manual opening processing described later (in FIG. 10) (step S82). In contrast to this, if no operation switch 1 is located in the position of manual opening MO (step S81: NO), it is judged whether the operation switch 1 is located in the position of auto opening AO or not (step S83). If the operation switch 1 is located in the position of auto opening AO (step S83: YES), it proceeds to auto opening processing described later (in FIG. 11) (step S84). In contrast to this, if no operation switch 1 is located in the position of auto opening AO (step S83: NO), it is returned to the step S72 and the normal rotation of the motor 3 is continued.

Thus, in the procedure of FIG. 9, when the constant acceleration or more is detected, the threshold value is also changed from the first threshold value to the second threshold value. When the constant acceleration or more is not detected and the motor 3 is then rotated by a predetermined amount, the threshold value is returned from the second threshold value to the first threshold value (steps S74 to S77). Therefore, even when the rotating amount of the motor 3 is increased by raising the power voltage, the threshold value is returned to the original threshold value when the motor 3 is rotated by the predetermined amount. Accordingly, the jamming detection using the normal threshold value is performed from a time point at which the window glass 101 is raised until a predetermined position. As this result, no jamming load is unnecessarily increased and the damage of the jammed object Z can be prevented.

Figure 10:
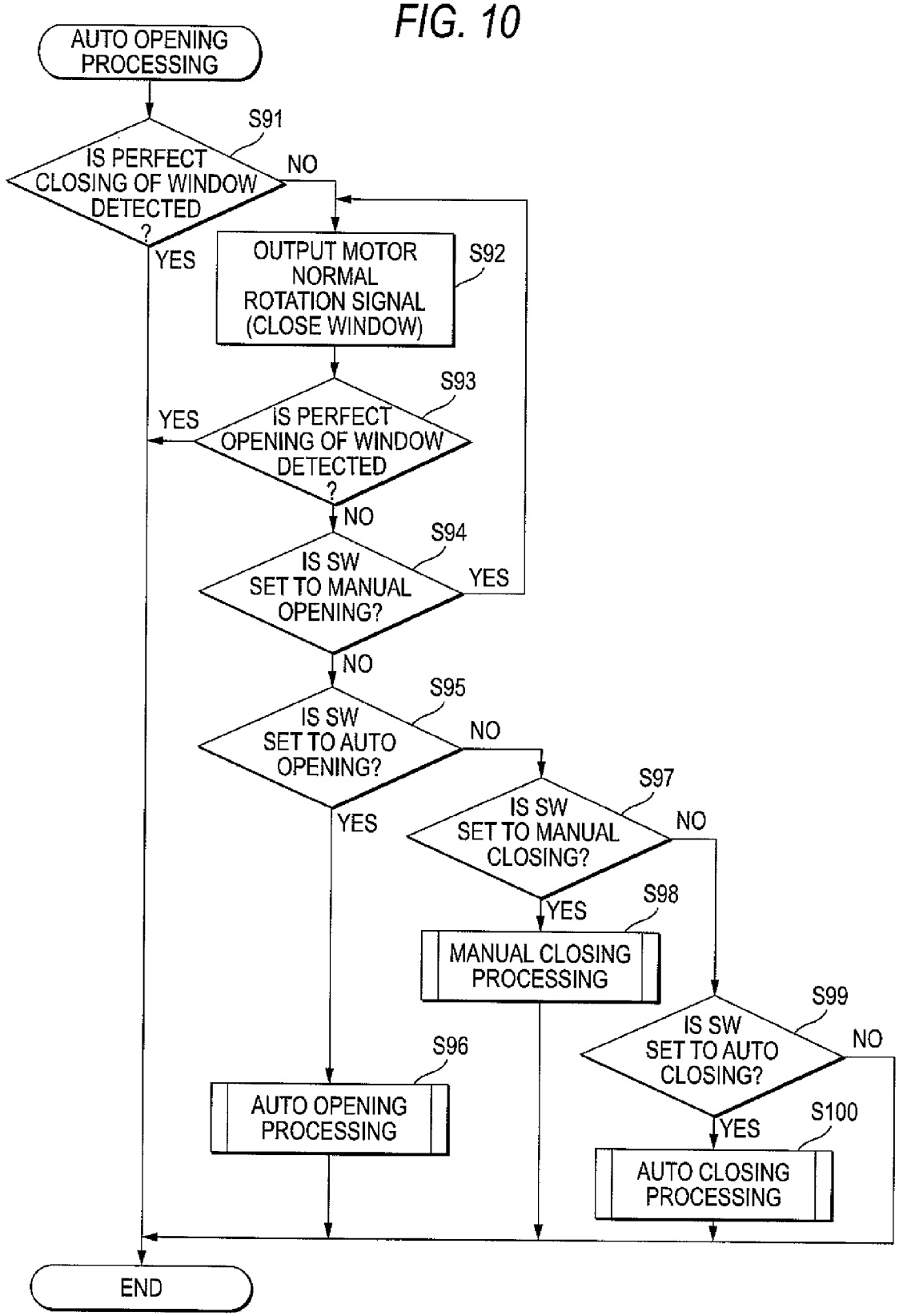
FIG. 10 is a flow chart showing a detailed procedure of manual opening processing.
Figure 11:
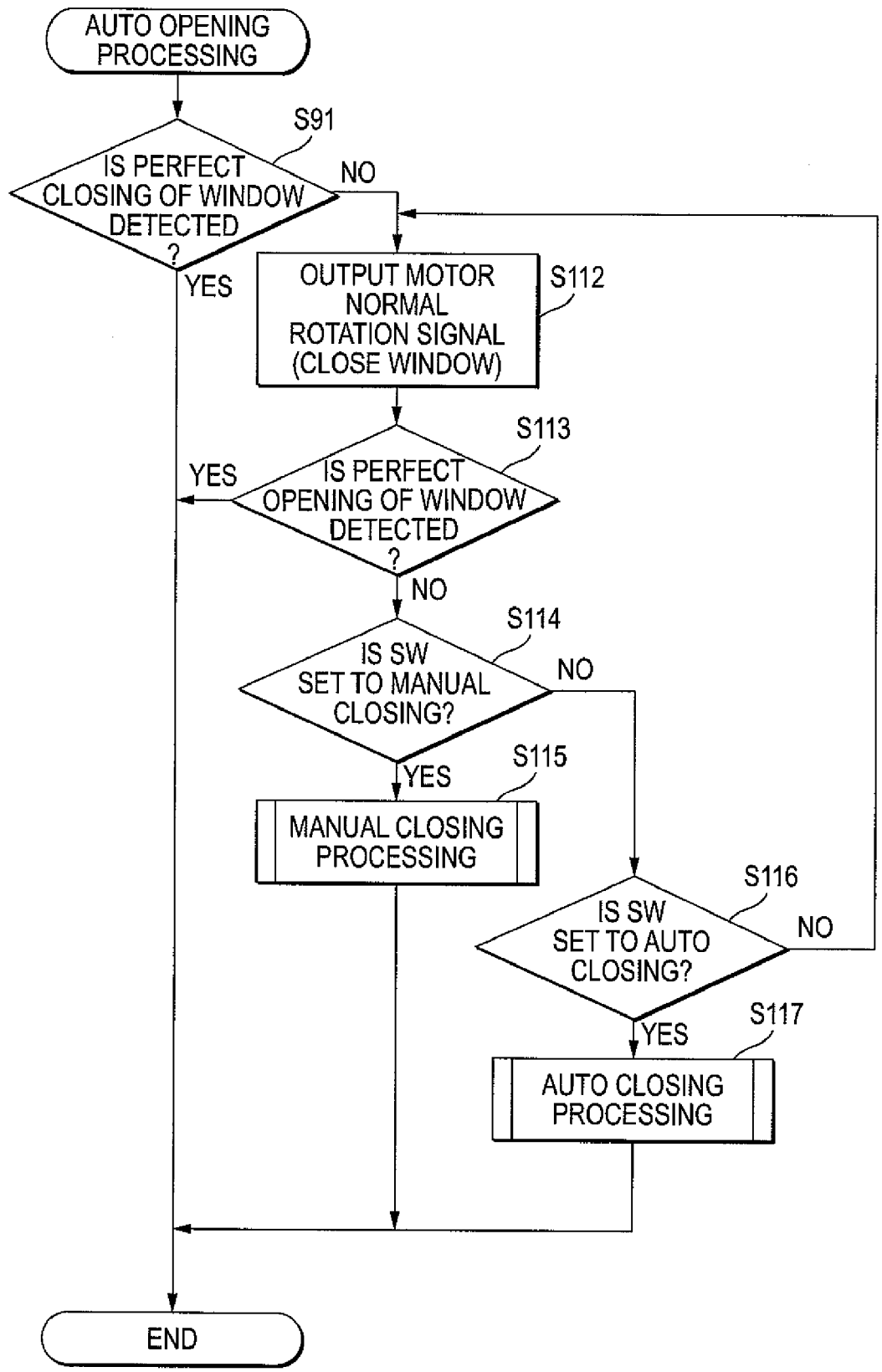
FIG. 11 is a flow chart showing a detailed procedure of auto opening processing.

FIG. 10 is a flow chart showing a detailed procedure of the manual opening processing (step S6 of FIG. 5). FIG. 11 is a flow chart showing a detailed procedure of the auto opening processing (step S8 of FIG. 5). Each procedure is executed by the CPU constituting the control section 9. Each of these constructions is not features of the invention, but will next be explained in a general way.

In the manual opening processing of FIG. 10, it is first judged whether the window 100 is perfectly opened by the manual opening operation or not on the basis of the output of the rotary encoder 4 (step S91). If the window 100 is perfectly opened (step S91: YES), the processing is terminated. In contrast to this, if no window 100 is perfectly opened (step S91: NO), a reverse rotation signal is outputted from the motor driving circuit 2 and the motor 3 is reversely rotated and the window 100 is opened (step S92). Subsequently, it is judged whether the window 100 is perfectly opened or not (step S93). If the window 100 is perfectly opened (step S93: YES), the processing is terminated. In contrast to this, if no window 100 is perfectly opened (step S93: NO), it is judged whether the operation switch 1 is located in the position of manual opening MO or not (step S94). If the operation switch 1 is located in the position of manual opening MO (step S94: YES), it is returned to the step S92 and the reverse rotation of the motor 3 is continued. In contrast to this, if no operation switch 1 is located in the position of manual opening MO (step S94: NO), it is judged whether the operation switch 1 is located in the position of auto opening AO or not (step S95). If the operation switch 1 is located in the position of auto opening AO (step S95: YES), it proceeds to auto opening processing described later (in FIG. 11) (step S96). In contrast to this, if no operation switch 1 is located in the position of auto opening AO (step S95: NO), it is judged whether the operation switch 1 is located in the position of manual closing MC or not (step S97). If the operation switch 1 is located in the position of manual closing MC (step S97: YES), it proceeds to the manual closing processing described before (in FIG. 6 or 8) (step S98). In contrast to this, if no operation switch 1 is located in the position of manual closing MC (step S97: NO), it is judged whether the operation switch 1 is located in the position of auto closing AC or not (step S99). If the operation switch 1 is located in the position of auto closing AC (step S99: YES), it proceeds to the auto closing processing described before (in FIG. 7 or 9) (step S100). In contrast to this, if no operation switch 1 is located in the position of auto closing AC (step S99: NO), it is terminated without performing any processing.

Next, in the auto opening processing of FIG. 11, it is first judged whether the window 100 is perfectly opened by the auto opening operation or not on the basis of the output of the rotary encoder 4 (step S111). If the window 100 is perfectly opened (step S111: YES), the processing is terminated. In contrast to this, if no window 100 is perfectly opened (step S111: NO), a reverse rotation signal is outputted from the motor driving circuit 2 and the motor 3 is reversely rotated and the window 100 is opened (step S112). Subsequently, it is judged whether the window 100 is perfectly opened or not (step S113). If the window 100 is perfectly opened (step S113: YES), the processing is terminated. In contrast to this, if no window 100 is perfectly opened (step S113: NO), it is judged whether the operation switch 1 is located in the position of manual closing MC or not (step S114). If the operation switch 1 is located in the position of manual closing MC (step S114: YES), it proceeds to the manual closing processing mentioned before (in FIG. 6 or 8) (step S115). In contrast to this, if no operation switch 1 is located in the position of manual closing MC (step S114: NO), it is judged whether the operation switch 1 is located in the position of auto closing AC or not (step S116). If the operation switch 1 is located in the position of auto closing AC (step S116: YES), it proceeds to the auto closing processing mentioned before (in FIG. 7 or 9) (step S117). In contrast to this, if no operation switch 1 is located in the position of auto closing AC (step S116: NO), it is returned to the step S112 and the reverse rotation of the motor 3 is continued.

The above-mentioned embodiment modes use examples in which the invention is applied to the power window device for a vehicle. However, the invention can be also applied to the window opening and closing controller of a window as in a building, etc.

What is claimed is:

1. A window opening and closing controller comprising:
   detecting means for detecting rotational speed of a motor for opening and closing a window;
   judging means for judging whether or not a foreign substance is jammed into the window on the basis of a comparing result of a changing amount of the rotational speed detected by said detecting means and a predetermined threshold value; and
   control means for controlling operations of said motor so as not to close the window when it is judged by said judging means that the foreign substance is jammed;
   wherein said threshold value is set to a first threshold value or a second threshold value;
   wherein the window opening and closing controller further comprises:
      threshold value changing means for changing said threshold value from the first threshold value to the second threshold value on the basis of the detection of closing of an opening and closing portion of a door; and
      threshold value returning means for returning said threshold value from the second threshold value to the first threshold value on the basis of the detection of the rotation of said motor by a predetermined rotating amount in a state in which said threshold value is set to the second threshold value.

2. The window opening and closing controller according to claim 1, wherein the closing of said opening and closing portion is detected by a detecting switch,
   said threshold value changing means changes said threshold value from the first threshold value to the second threshold value when a detecting signal is outputted from said detecting switch, and
   said threshold value returning means returns said threshold value from the second threshold value to the first threshold value on the basis of the detection of the rotation of said motor by the predetermined rotating amount after said threshold value is changed.

* * * * *